(12) United States Patent
Elwart et al.

(10) Patent No.: US 9,604,609 B2
(45) Date of Patent: Mar. 28, 2017

(54) EMERGENCY IN-LANE STEERING ASSIST WITH BRAKING

(71) Applicant: Ford Global Technologies, LLC, Dearborn, MI (US)

(72) Inventors: Shane Elwart, Ypsilanti, MI (US); Walter Joseph Talamonti, Dearborn, MI (US); Doug Scott Rhode, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 14/275,062

(22) Filed: May 12, 2014

(65) Prior Publication Data
US 2015/0321668 A1 Nov. 12, 2015

(51) Int. Cl.
*B60W 30/09* (2012.01)
*B62D 6/00* (2006.01)
*G05D 1/02* (2006.01)
*B60W 10/18* (2012.01)
*B60W 10/20* (2006.01)
(Continued)

(52) U.S. Cl.
CPC ........ *B60T 8/1755* (2013.01); *B60T 8/17557* (2013.01); *B60W 10/18* (2013.01); *B60W 10/20* (2013.01); *B60W 30/09* (2013.01); *B60W 30/10* (2013.01); *B62D 6/00* (2013.01); *G05D 1/0246* (2013.01); *G05D 1/0257* (2013.01);
(Continued)

(58) Field of Classification Search
CPC ...... B60W 30/08; B60W 30/09; B60W 10/18; B60W 10/20; G08G 1/16; B62D 6/00; B62D 6/02; G05D 1/0246; G05D 1/0257
See application file for complete search history.

(56) References Cited

U.S. PATENT DOCUMENTS 8,060,306 B2  11/2011  Puhalla et al.
8,527,172 B2   9/2013  Moshchuk et al.
(Continued)

FOREIGN PATENT DOCUMENTS

WO    2012117044    9/2012

OTHER PUBLICATIONS

Sensors, "Autonomous Manoeuvring Systems for Collision Avoidance on Single Carriageway Roads," Multidisciplinary Digital Publishing Institute (Nov. 29, 2012).

*Primary Examiner* — Yonel Beaulieu
*Assistant Examiner* — Martin Weeks
(74) *Attorney, Agent, or Firm* — Frank A. MacKenzie; Price Heneveld LLP

(57) ABSTRACT

An emergency in-lane steering assist system for use during a braking event comprises an object sensor for detecting the presence of an object in front of a motor vehicle and providing data from which the distance from the object to the motor vehicle is determined and a velocity sensor providing data from which the forward velocity of the motor vehicle is determined. A controller in communication with the object sensor and the velocity sensor calculates a Time to Contact (TTC) with the detected object and a steering system is responsive at least in part to operation by the controller. If the calculated TTC is less than a predetermined TTC, the controller provides a lateral steering input during the braking event to reduce the linear distance traveled by the motor vehicle relative to a predetermined path in the lane.

18 Claims, 6 Drawing Sheets

(51) Int. Cl.
*B60T 8/1755* (2006.01)
*B60W 30/10* (2006.01)
*G08G 1/16* (2006.01)

(52) U.S. Cl.
CPC ............... *G08G 1/16* (2013.01); *G08G 1/166* (2013.01); *B60T 2201/087* (2013.01); *G08G 1/167* (2013.01)

(56) References Cited

U.S. PATENT DOCUMENTS

| | | |
|---|---|---|
| 2008/0046145 A1 | 2/2008 | Weaver et al. |
| 2009/0026002 A1* | 1/2009 | Taniguchi ............... B62D 5/062 180/423 |
| 2009/0192710 A1* | 7/2009 | Eidehall ............. B62D 15/0265 701/301 |
| 2010/0030426 A1 | 2/2010 | Okita |
| 2011/0077823 A1* | 3/2011 | Nishikawa ............. B62D 7/159 701/41 |
| 2013/0124041 A1 | 5/2013 | Belser et al. |
| 2013/0238192 A1 | 9/2013 | Breu |
| 2014/0244142 A1* | 8/2014 | Matsubara .......... B60W 10/184 701/116 |

* cited by examiner

EMERGENCY IN-LANE STEERING ASSIST WITH BRAKING

FIELD OF THE INVENTION

The present invention generally relates to a system and method for decreasing the effective braking distance within which to slow a moving motor vehicle approaching an object within the present path of the motor vehicle, preferably to a stop. In particular, the present invention relates to a system for inducing a lateral steering input to effectively reduce the linear distance traveled by the motor vehicle during the braking event relative to a predetermined path in the lane and a method for accomplishing the same.

BACKGROUND OF THE INVENTION

During the course of operating a motor vehicle, certain undetected and unexpected events, such as the sudden appearance of a deer or a pedestrian or the sudden deceleration of a leading motor vehicle located ahead of the primary motor vehicle, can result in situations wherein an immediate response is desired in order to avoid a collision. Recently, on-board sensors are being increasingly relied upon to provide a signal to a vehicle controller indicating the presence of objects situated within the forward path of the motor vehicle and thereby alert the driver.

Using the forward velocity of the vehicle and the measured distance to the object ahead, the motor vehicle controller may be used to calculate a Time to Contact (TTC) of the detected object. In some instances, the calculated TTC may be insufficient for the motor vehicle braking system to bring the motor vehicle to a stop in the present lane. In such driving circumstances, one solution has been for the driver, or motor vehicle controller-operated steering system if so equipped, to create an abrupt steering input and thereby attempt to steer around the object located within the forward path of the motor vehicle. Since such abrupt steering maneuvers tend to cause the motor vehicle to veer outside of its present lane, such maneuvers are undesirable. Hence, a solution that addresses this concern would be advantageous.

The solution disclosed herein is a system and method of increasing the effective TTC with a detected object. In combination with the application of an assisted steering capability, disclosed herein is a system and method that induces a lateral steering input with or without driver input into the motor vehicle steering. The lateral steering input can be an oscillating side-to-side steering input expressed as a maximization of lateral steering as, for example, a sine wave modulated within a defined range of frequencies and amplitudes, thereby reducing the linear distance in the lane traveled by the motor vehicle relative to a predetermined path in the lane.

Thus, the solution presented by the present system and method increasing the effective TTC for a motor vehicle body is a relatively low-cost solution that improves the ability of bringing a motor vehicle to a stop in an effective shorter distance.

SUMMARY OF THE INVENTION

According to one aspect of the present disclosure, an emergency in-lane steering assist system for maintaining a motor vehicle within a lane during a braking event comprises an object sensor for detecting the presence of an object in a present path of the motor vehicle and from which the distance from the object to the motor vehicle may be determined, the object sensor transmitting a signal in response to the presence of the object in front of the motor vehicle and providing data from which the distance from the object to the motor vehicle is determined. A velocity sensor transmits a signal and provides data from which the forward velocity of the motor vehicle is determined. A controller in communication with the object sensor and the velocity sensor calculates a TTC with the detected object. A steering system is responsive at least in part to operation by the controller. If the calculated TTC is less than a predetermined TTC, the controller provides a lateral steering input during the braking event to reduce the linear distance traveled by the motor vehicle relative to a predetermined path in the lane.

Still another aspect of the present disclosure is an emergency in-lane steering assist system where the lateral steering input is an oscillating side-to-side steering input expressed as an oscillating wave modulated within a defined range of frequencies and amplitudes.

Yet another aspect of the present disclosure is an emergency in-lane steering assist system where the oscillating side-to-side steering input is expressed as a sine wave modulated within a range of frequencies and amplitudes.

Still another aspect of the present disclosure is an emergency in-lane steering assist system where the oscillating side-to-side steering input is expressed as a plurality of superimposed curves.

A further aspect of the present disclosure is an emergency in-lane steering assist system where the steering system is electronically actuated.

Yet a further aspect of the present disclosure is an emergency in-lane steering assist system where the steering system is hydraulically actuated.

An additional aspect of the present disclosure is an emergency in-lane steering assist system where the object sensor is a forward directed camera for determining the range and range rate of change to the object.

Yet another aspect of the present disclosure is an emergency in-lane steering assist system where the object sensor is a forward directed radar-based transmitter and receiver for determining the range and range rate of change to the object.

A still further aspect of the present disclosure is an emergency in-lane steering assist system further comprising a manually operated braking system, wherein, if the calculated TTC is less than a predetermined TTC, the controller provides the lateral steering input and the braking system is manually engaged.

Another aspect of the present disclosure is an emergency in-lane steering assist system further comprising a braking system responsive at least in part to operation by the controller, wherein, if the calculated TTC is less than a predetermined TTC, the controller provides a braking input to the braking system in addition to the lateral steering input.

A yet additional aspect of the present disclosure is an emergency in-lane steering assist where the oscillating side-to-side steering input is expressed as a sine wave modulated within a defined range of frequencies and amplitudes is a function of the group consisting of one or more of the roadway surface coefficient of friction, the ambient temperature, the road curvature, the vehicle instantaneous lane detection capability, the vehicle forward velocity, the vehicle lateral velocity, the vehicle yaw rate, the vehicle roll rate, the vehicle pitch rate, and the instantaneous TTC.

A further aspect of the present disclosure is an emergency in-lane steering assist system where the oscillating side-to-side steering input is expressed as a sine wave modulated within a defined range of frequencies and amplitudes is also a function of the group consisting of considerations of human physiology, including lateral acceleration and deceleration.

Still another aspect of the present disclosure is an emergency in-lane steering assist system where the oscillating side-to-side steering input is expressed as a sine wave modulated within a defined range of frequencies and amplitudes permits a driver to maintain overall steering control.

A yet additional aspect of the present disclosure is an emergency in-lane steering assist system where the oscillating side-to-side steering input is expressed as a sine wave modulated within a defined range of frequencies and amplitudes is obtained by a drive by wire system that isolates the oscillating side-to-side steering input from a driver steering wheel.

An additional aspect of the present disclosure is a emergency in-lane steering assist system where the steering system comprises a front wheel steering assembly and the lateral steering input is directed to the front wheel steering assembly.

Another aspect of the present disclosure is an emergency in-lane steering assist system of where the steering system comprises a rear wheel steering assembly and the lateral steering input is directed to the rear wheel steering assembly.

Still another aspect of the present disclosure is an emergency in-lane steering assist system where the steering system comprises a front wheel steering assembly and a rear wheel steering assembly and the lateral steering input is directed to one or both of the front wheel steering assembly and the rear wheel steering assembly.

A further aspect of the present disclosure is a steering assist system for a motor vehicle comprising a sensor for detecting the presence of and distance from an object relative the motor vehicle, a velocity sensor, a controller in communication with the sensor and the velocity sensor, and a steering system responsive to the controller, wherein the controller selectively provides a lateral steering input to reduce the linear distance traveled by the motor vehicle.

A yet additional aspect of the present disclosure is a method of providing emergency in-lane steering assist for maintaining a motor vehicle within a lane during a braking event, the method comprising the steps of: detecting the presence of an object in a present path of the motor vehicle and providing data from which the distance from the object to the motor vehicle may be determined; transmitting a signal in response to the presence of the object in front of the motor vehicle and providing data to a controller from which the distance from the object to the motor vehicle is determined; transmitting a signal and providing data to the controller from which the forward velocity of the motor vehicle is determined; calculating a TTC with the detected object; and selectively actuating a steering system responsive at least in part to operation by the controller, wherein if the calculated TTC is less than a predetermined TTC, the controller provides a lateral steering input expressed as an oscillating curve modulated within a defined range of frequencies and amplitudes during the braking event to reduce the linear distance traveled by the motor vehicle relative to a predetermined path in the lane.

Still another aspect of the present disclosure is a method further comprising the step of selectively actuating a braking system responsive at least in part to operation by the controller, wherein, if the calculated TTC is less than a predetermined TTC, the controller provides a braking input to the braking system and the controller provides an oscillating side-to-side steering input to reduce the linear distance traveled by the motor vehicle relative to a predetermined path in the lane.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
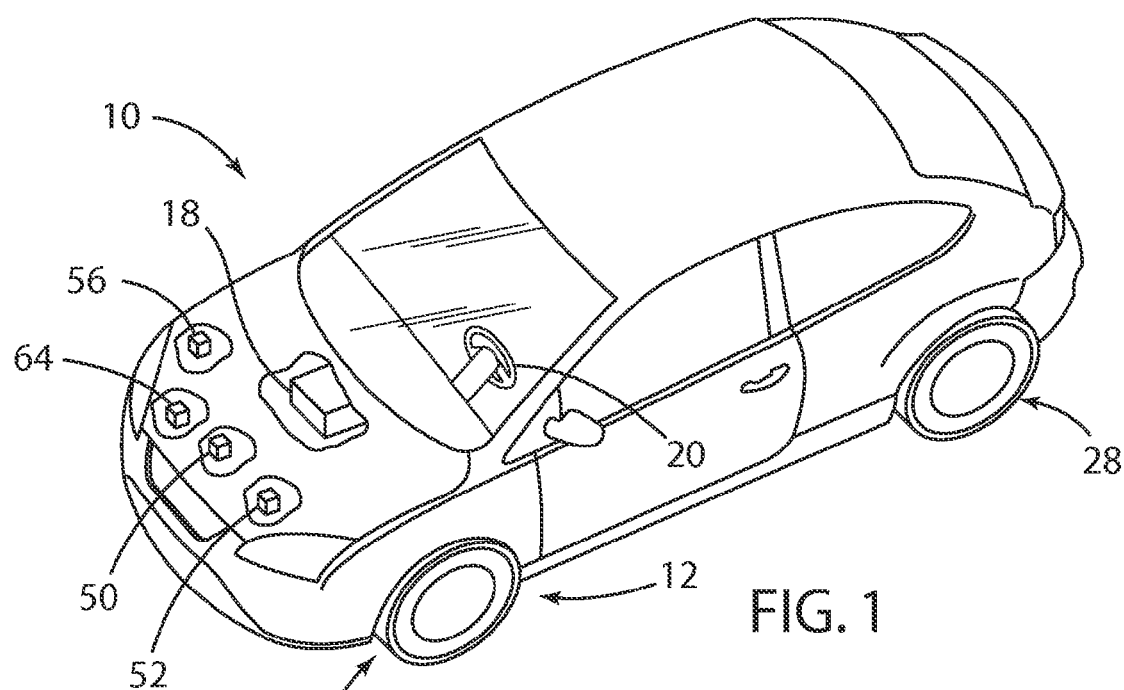
FIG. 1 is a perspective view of a motor vehicle incorporating the emergency in-lane steering assist system for maintaining a motor vehicle within a lane during a braking event in accordance with the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
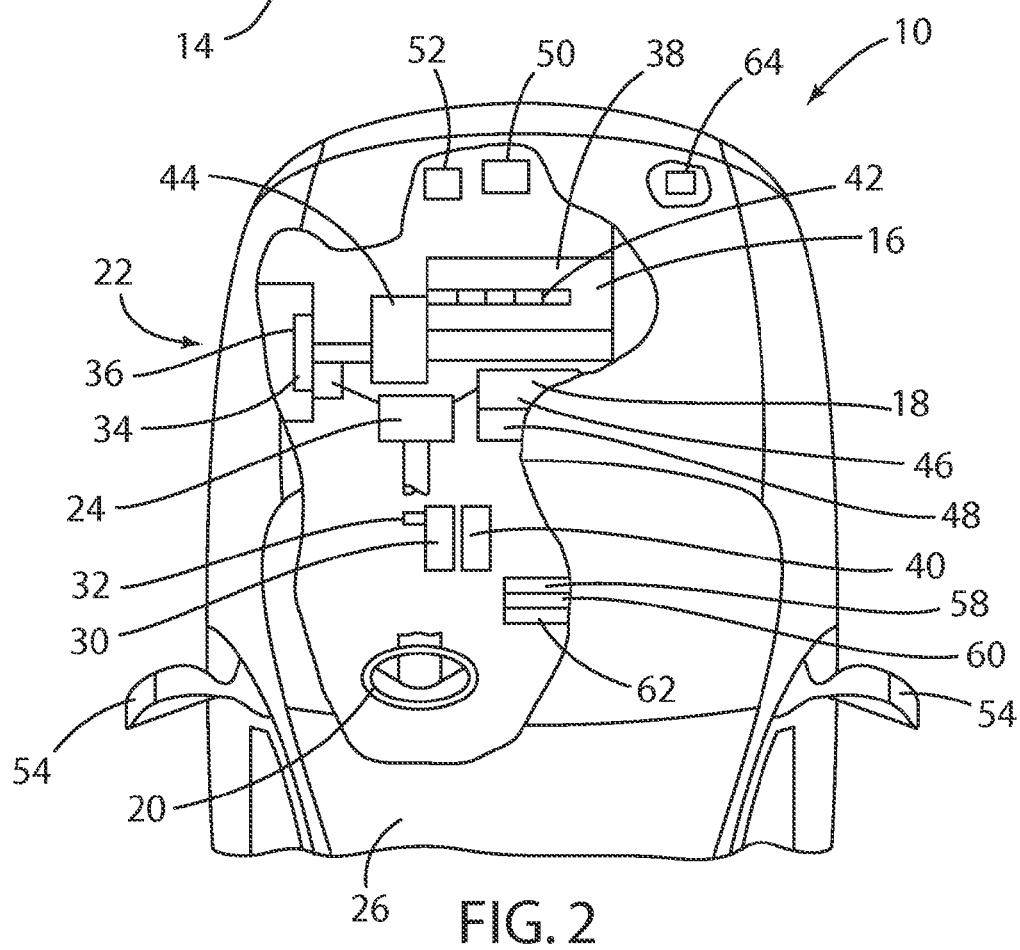
FIG. 2 is a top view of a motor vehicle incorporating the emergency in-lane steering assist system for maintaining a motor vehicle within a lane during a braking event in accordance with the present disclosure.
Figure 3:
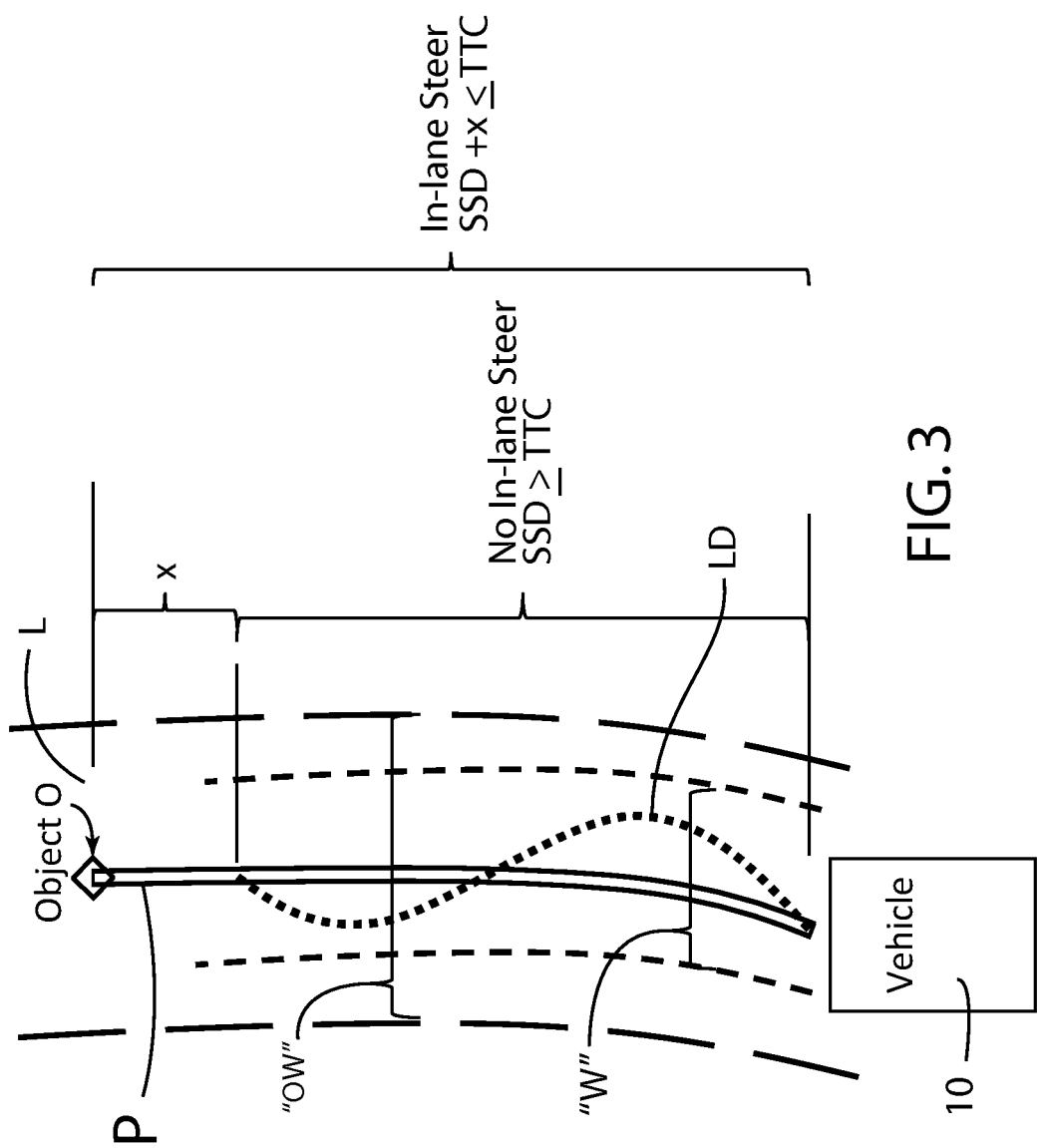
FIG. 3 is a schematic view of a motor vehicle employing the emergency in-lane steering assist system for maintaining a motor vehicle within a lane during a braking event in accordance with the present disclosure.

The motor vehicle 10 adapted for use in conjunction with the system and method of the present disclosure is shown in FIGS. 1 and 2 and comprises several relevant features. These features include a motor vehicle steering system 12, a motor vehicle braking system 14, a motor vehicle drive system 16, and a vehicle controller 18. In accordance with the present disclosure, at least the motor vehicle steering system 12, and preferably also the motor vehicle braking system 14, is responsive at least in part to operation by the vehicle controller 18, as described below.

As shown, the motor vehicle steering system 12 preferably comprises a drive by wire steering system having an electrical or electronic control interface for communicating steering inputs from a steering wheel 20 with the vehicle controller 18. However, other steering systems, such as an electrohydraulic steering system or an electromechanical steering system, can be used in conjunction with the present disclosure. The motor vehicle steering system 12 preferably comprises a front wheel steering assembly 22 and an electrically driven steering gear and pinion assembly 24 mechanically coupled with the front wheel steering assembly 22. The steering wheel 20 is located in the passenger compartment 26 of the motor vehicle 10 and is operated by the driver of the motor vehicle 10. The steering wheel 20 also preferably has an electrical or electronic control interface for communicating with the vehicle controller 18, wherein steering input signals from the driver through the steering wheel 20 are communicated to the vehicle controller 18, processed, and thereby used to generate output signals to the electrically driven steering gear and pinion assembly 24 to actuate the front wheel steering assembly 22. It is further contemplated herein that a rear wheel steering assembly 28 can be combined with or used independently of the front wheel steering assembly 22 in accordance with the present disclosure.

The motor vehicle braking system 14 similarly preferably comprises a brake by wire braking system having an electrical or electronic control interface for communicating with the vehicle controller 18. However, other braking systems, such as an electrohydraulic braking system or an electromechanical braking system, can be used in conjunction with the present disclosure. In such a preferred embodiment, the motor vehicle braking system 14 includes an electrical brake 34 situated at a driven front wheel assembly 36 on either side of the motor vehicle 10. Actuation of a brake pedal 30 in the passenger compartment 26 of the motor vehicle 10 by the driver of the motor vehicle actuates a sensor 32, that in turn creates a braking input signal that is communicated to the vehicle controller 18, processed, and thereby used to generate output signals to the electrical brake 34, which in turn actuates a friction surface that is urged against a corresponding rotating surface on the driven front wheel assembly 36. Although the motor vehicle steering system 12 and motor vehicle braking system 14 preferably rely upon digital signals, as noted above, to control steering and braking as shown, the steering system 12 and motor vehicle braking system 14 may also use analog signals.

The motor vehicle drive system 16 preferably comprises an internal combustion engine 38 under the control of the vehicle controller 18. Alternatively, a separate engine controller may be used. The internal combustion engine 38 is preferably controlled as is traditional through the use of a throttle pedal 40 in combination with an air and fuel metering system 42, such as a fuel injection system, carburetor, or other fuel delivery system for internal combustion engines. The motor vehicle drive system 16 may alternatively comprise an electric motor (not shown) either alone or in combination with the internal combustion engine 38. The motor vehicle drive system 16 preferably includes a transmission 44 for communicating engine torque to the driven front wheel assembly 36. However, it is contemplated within the scope of this disclosure that a system could be envisioned that would employ an electric motor (not shown) mounted at each driven front wheel assembly 36, either as a battery powered system or in combination with an internal combustion engine. In such a motor vehicle 10, it is further contemplated that the electric motor at each driven front wheel assembly 36 can be reversed in operation to act as or augment the braking effort discussed above and recapture energy for recharging the motor vehicle battery, if so equipped.

The vehicle controller 18 preferably includes a data processor 46 and data storage device 48 for processing data relating to the motor vehicle 10 forward velocity (through velocity sensor 50), the ambient temperature (through temperature sensor 52), the vehicle instantaneous lane detection capability (through each of a pair of lane monitoring sensors 54), the vehicle lateral velocity (through lateral velocity sensor 56), the vehicle yaw rate (through yaw accelerometer 58), the vehicle roll rate (through roll accelerometer 60), and the vehicle pitch rate (through pitch accelerometer 62). The lane monitoring sensors 54 are employed to detect the lateral distance allowed for the motor vehicle 10 to travel in a lane L. Other driving factors, such as the roadway surface coefficient of friction, may be calculated from the above data.

A forward directed sensor 64 is provided to detect the presence of an object O in the present forward path P of the motor vehicle 10 and, in combination with the vehicle controller 18, determine the distance from the object O to the motor vehicle 10 and the rate of change of such distance. The forward directed sensor 64 may be a forward directed camera for determining the range and range rate of change to the object. Alternatively, the forward directed sensor 64 may be a forward directed radar-based transmitter and receiver for determining the range and range rate of change to the object. Additional potential forward directed sensors may include laser-based technology or ultrasonic-based technology. Particularly in the case where a camera is used as the forward directed sensor 64, the forward directed sensor 64 preferably may also provide information to the vehicle controller 18 regarding the road curvature ahead of the motor vehicle 10.

Upon encountering an object O in the present forward path of the motor vehicle 10, the forward directed sensor 64 directs a signal to the vehicle controller 18, which, depending on the type of forward directed sensor 64, processes the signal to determine the distance from the motor vehicle 10 to the object O, the rate of closure of the distance between the motor vehicle 10 and the object O and the calculated available braking distance within which the motor vehicle 10 may be brought to a complete stop within the present lane L of the motor vehicle 10. That is, the vehicle controller 18 calculates a TTC with the object O. The vehicle controller 18 then compares the calculated TTC with the object O to the available braking distance within which the motor vehicle 10 may be brought to a complete stop within the present lane L of the motor vehicle 10 or the safe stop distance SSD.

Given the motor vehicle's 10 forward velocity, the roadway surface coefficient of friction, and the other factors that inform the calculated available braking distance corresponding to the safe stop distance SSD, if the distance from the motor vehicle 10 to the object O is greater than the safe stop distance SSD, the vehicle controller 18 generates a warning a signal to the driver so that the driver may apply the brake pedal 30 to engage the braking system 14 and bring the motor vehicle 10 to a complete stop within the present lane L of the motor vehicle before collision with the object O. Alternatively, if so equipped and engaged, the vehicle controller 18 may directly generate a signal to engage the motor vehicle braking system 14 and bring the motor vehicle 10 to a complete stop within the present lane L of the motor vehicle 10 before collision with the object.

However, if the TTC with the object O is below the predetermined value for safe stop distance SSD, which means that the distance from the motor vehicle 10 to the object O is less than the calculated available braking distance within which the motor vehicle 10 may be brought to a complete stop within the present lane L of the motor vehicle 10 prior to collision with the object O, the vehicle controller 18 implements the system and method of the present disclosure. As before, the vehicle controller 18 preferably generates a warning signal to the driver so that the driver may apply the brake pedal 30 to engage the motor vehicle braking system 14 and begin to reduce the forward velocity of the motor vehicle 10 before collision with the object O to minimize the severity of any impact. Alternatively, again if so equipped and engaged, the vehicle controller 18 may directly generate a signal to engage the braking system 14 and begin to reduce the forward velocity of the motor vehicle.

Additionally, if the TTC with the object O is below a predetermined value for the safe stop distance SSD, the vehicle controller 18 generates a curve function and transmits a signal to the motor vehicle steering system 12 to induce a lateral steering input during the braking event that effectively extends the overall distance LD actually traveled by the motor vehicle 10. Since the overall distance LD has a significant side component, the linear distance traveled by the motor vehicle 10 relative to a predetermined path P in the lane is reduced. The predetermined path P is typically preferably the center path within the lane width W of the lane, but curvatures of the lane L in the front of the vehicle may dictate a departure from this center path. As discussed below, the lateral steering input may be an oscillating side-to-side steering input and may also be a sine wave modulated within a defined range of frequencies and amplitude, depending on the TTC and the available calculated safe stopping distance SSD. That is, if a more aggressive application of the present system and method is required, due to a significant difference between the TTC and calculated safe stopping distance SSD, the frequency and amplitude of the curve function may be maximized within the safety limits of known motor vehicle 10 capabilities and behavior. If contrary conditions exist, a more moderate frequency and amplitude can be selected.

Figure 4:
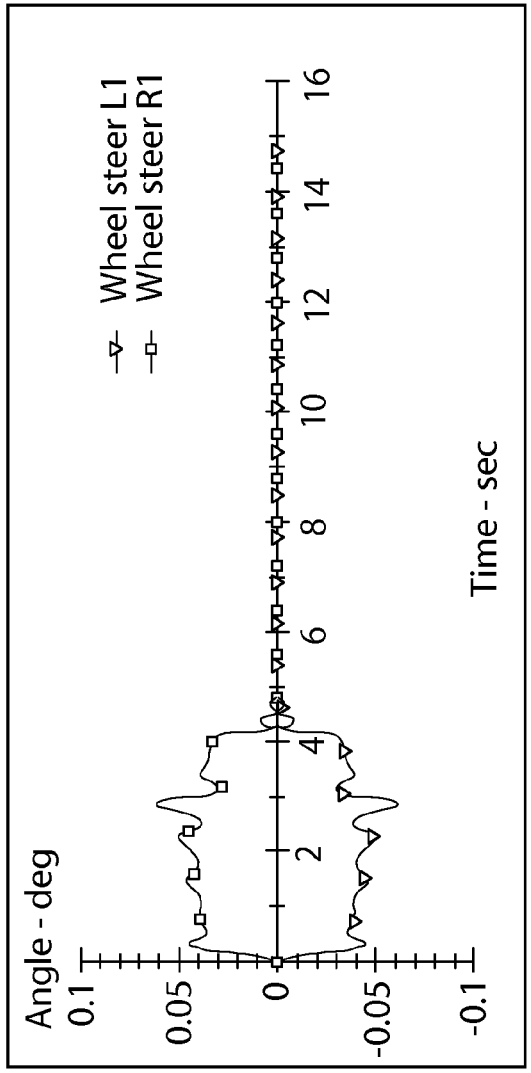
FIG. 4 is a graphical representation of the steered front wheel assembly angle over time during a simulated emergency stop of a motor vehicle of the prior art.
Figure 6:
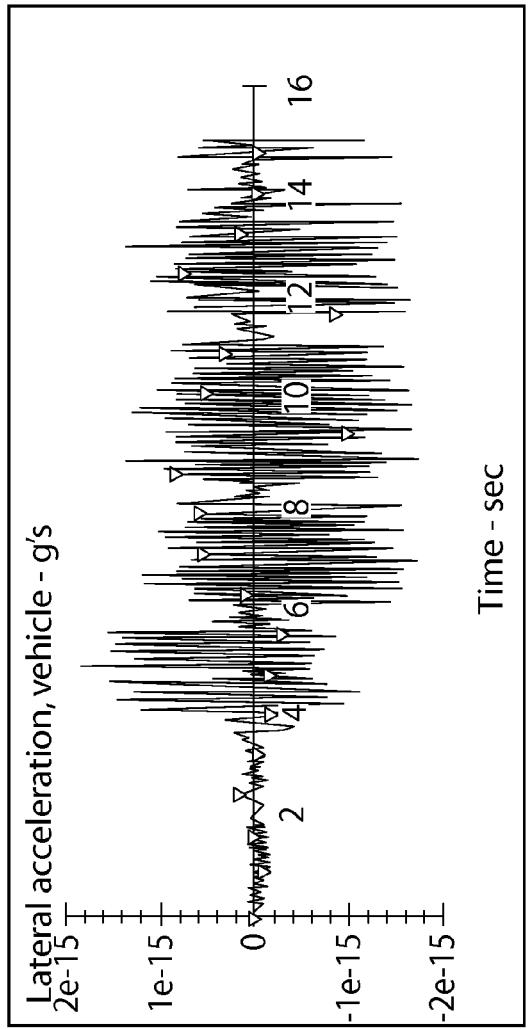
FIG. 6 is a graphical representation of the lateral acceleration over time during a simulated emergency stop of a motor vehicle of the prior art.

For example, FIGS. 4-11 show comparative simulated applications of the concept disclosed herein during a simulated emergency braking event. In both events, the motor vehicle 10 velocities are reduced from 60 kph to 0 kph within about 4 seconds, with a motor vehicle braking system 14 input pressure of 3 MPa brake pressure, which is equivalent to full braking effort. The first simulation is shown in FIGS. 4-7. As shown in FIG. 4, there is no side-to-side oscillating steering input and, as shown in FIG. 6, there is no lateral acceleration during the braking event. As further shown in FIGS. 5 and 7, the effective total stopping distance is 33.3 linear longitudinal meters.

Figure 8:
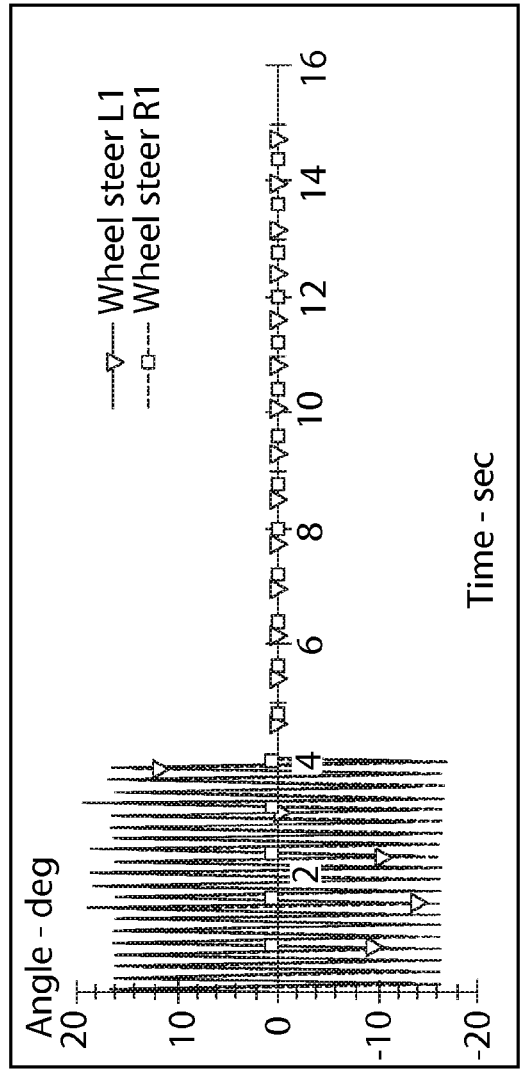
FIG. 8 is a graphical representation of the steered front wheel assembly angle over time during a simulated emergency stop of a motor vehicle employing the emergency in-lane steering assist system and method for maintaining a motor vehicle within a lane during a braking event in accordance with the present disclosure.
Figure 5:
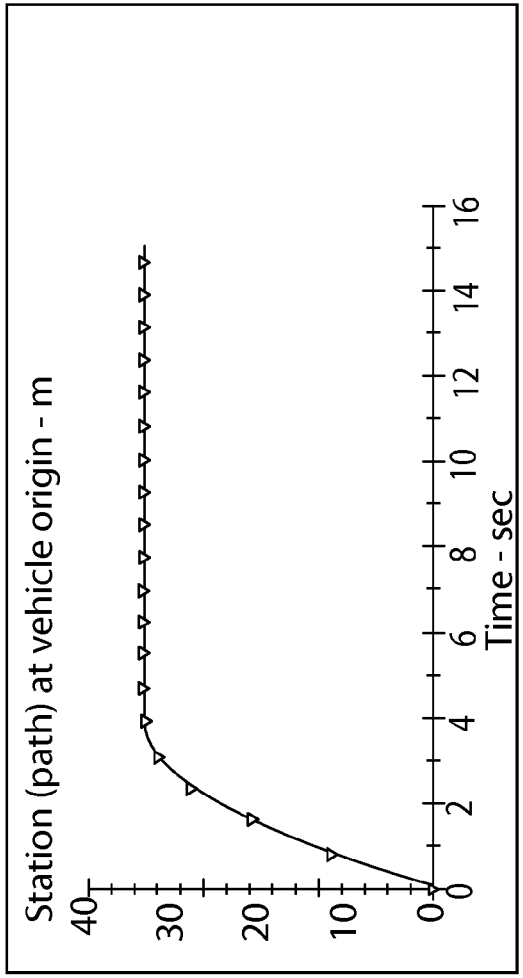
FIG. 5 is a graphical representation of the distance traveled over time during a simulated emergency stop of a motor vehicle of the prior art.
Figure 9:
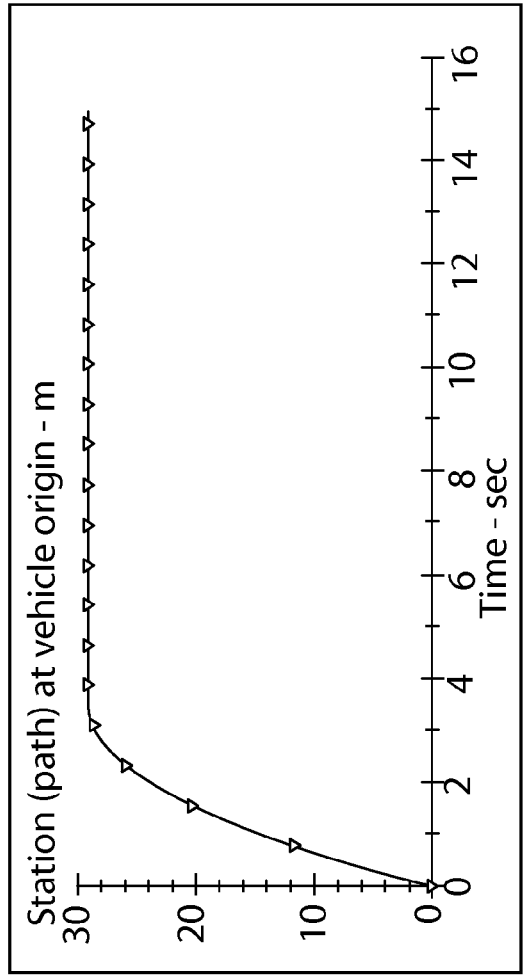
FIG. 9 is a graphical representation of the distance traveled over time during a simulated emergency stop of a motor vehicle employing the emergency in-lane steering assist system and method for maintaining a motor vehicle within a lane during a braking event in accordance with the present disclosure.
Figure 10:
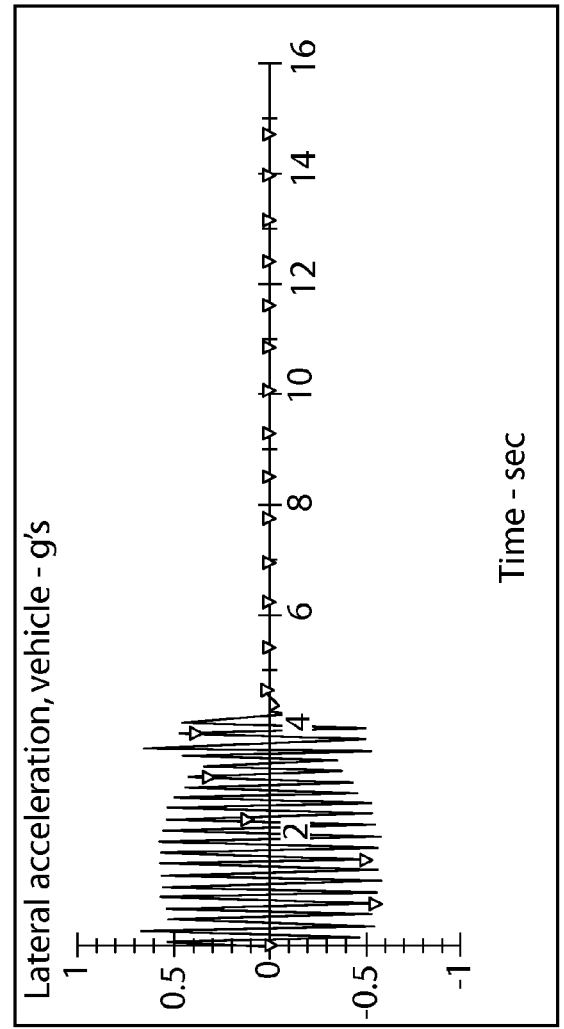
FIG. 10 is a graphical representation of the lateral acceleration over time during a simulated emergency stop of a motor vehicle employing the emergency in-lane steering assist system and method for maintaining a motor vehicle within a lane during a braking event in accordance with the present disclosure.
Figures 7, 11:
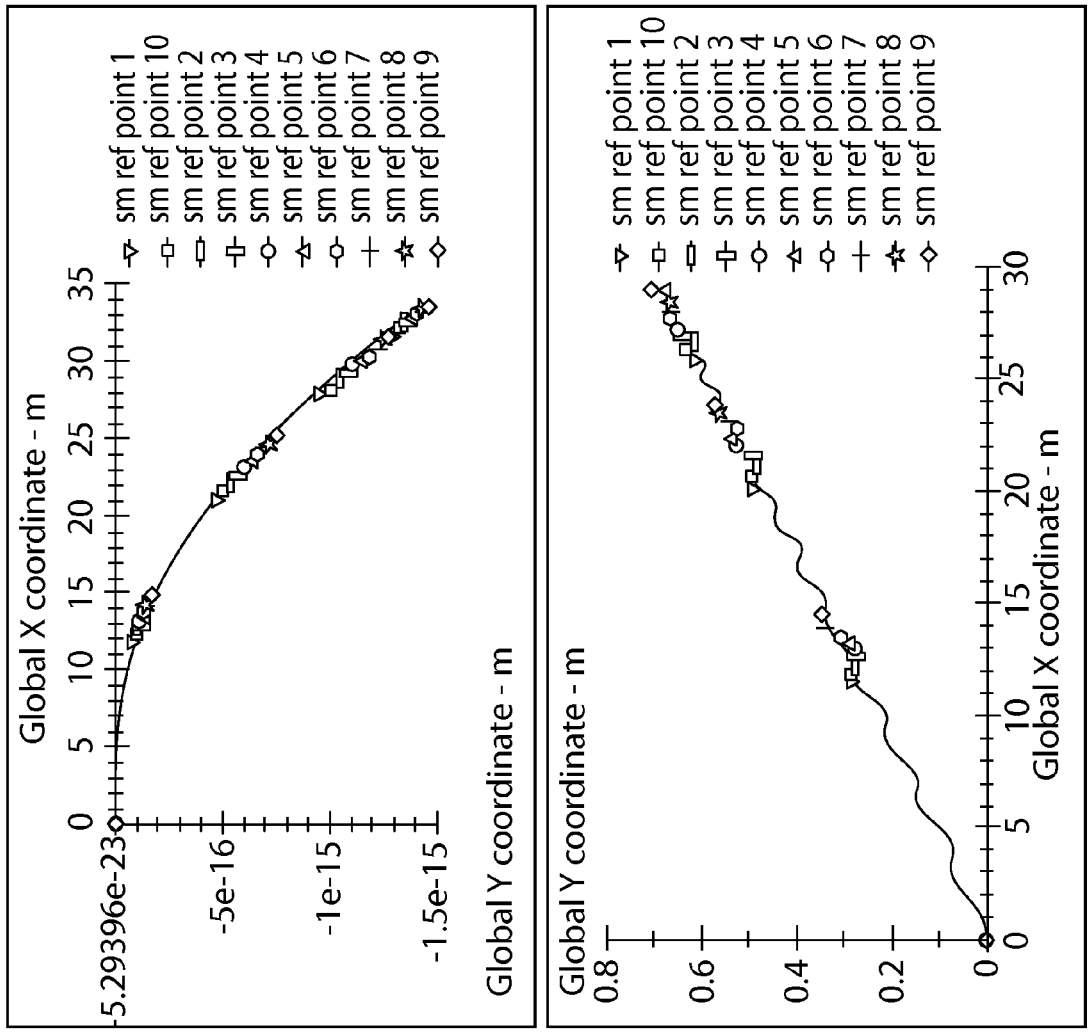
FIG. 7 is a graphical representation of the lateral displacement relative the longitudinal travel during a simulated emergency stop of a motor vehicle of the prior art.
FIG. 11 is a graphical representation of the lateral displacement relative the longitudinal travel during a simulated emergency stop of a motor vehicle employing the emergency in-lane steering assist system and method for maintaining a motor vehicle within a lane during a braking event in accordance with the present disclosure.

In contrast, the second simulation, applying the system and method of the present disclosure, is shown in FIGS. 8-11. As shown in FIG. 8, the front steering assembly 22 is provided with a sinusoid side-to-side oscillating steering input having a frequency of about 20 Hz, causing significant lateral acceleration during the braking event, as shown in FIG. 10. As a consequence, the effective total stopping distance of about 29 longitudinal meters was calculated, as shown in FIGS. 9 and 11. The difference in 4.3 meters represents a 12% decrease in the linear stopping distance of motor vehicle 10.

The system and method of the present disclosure, however, should be not be limited to any particular curve function, such as a sine wave, or any particular oscillation frequency or amplitude. While the use of a sine wave function has been considered as a solution to modulate lateral input, there may be other curve functions useful in modulating the lateral steering input. For example, a predefined map may be used to define a lateral steering input based on one or more following factors, such as the roadway surface coefficient of friction, the ambient temperature, the road curvature, the vehicle instantaneous lane detection capability, the vehicle forward velocity, the vehicle lateral velocity, the vehicle yaw rate, the vehicle roll rate, and the vehicle pitch rate, as well as the instantaneously calculated TTC.

One outcome of these factors may be a lateral steering input that results in simply driving the motor vehicle 10 in a large arc within the lane L, while another outcome may result in a lateral steering input that begins as a large arc in a first direction and ends with a small arc in the opposite direction. Yet another outcome may begin with a large arc (so as to avoid unnecessary oscillation if the TTC eminence is removed or reduced) and follow with progressively higher frequency sinusoidal oscillations as the motor vehicle 10 approaches the object O. Also, while the use of 20 Hz has been considered as a solution to modulate lateral input in the model, the frequency may also be adjusted based on the factors set forth above, as well as factors in the group consisting of considerations of human physiology, including the human toleration of lateral acceleration and deceleration.

Additionally, the frequency may be a function of the desire to render the oscillations minimally perceivable to the motor vehicle driver, with the benefit of allowing the driver to maintain overall steering control. For example, in the case of a complete steer by wire motor vehicle steering system 12, the driver need not have any sensation through the driver steering wheel 20 steering as to the oscillating steering input generated by the vehicle controller 18. Thus, a benefit of a drive by wire is that the lateral steering input is isolated from the driver steering wheel 20 and driver. Also, it is contemplated that the use of a rear wheel steering assembly 28 in combination with the front wheel steering assembly 22, where the driver steering input is directed to the front steering assembly 22 and where the lateral steering input is directed to only the rear wheel steering assembly 28, can provide a method of allowing the driver to maintain control of the steering wheel 20 during operation of the system and method disclosed herein.

The amplitude may likewise be modified as a function of the same factors that govern the selection of the curve function and frequency. Additionally, the amplitude may also be a function of the curvature of the lane L or the overall width OW of the lane, such that a partial sinusoid oscillation may be generated where the motor vehicle 10 is controlled to the outermost curvature of the lane L or partial crossing of a lane L (i.e., one tire over the outer curvature of a lane L) in order to achieve maximum reduction in speed before TTC. The lateral amplitude may also begin with the largest amplitude (again so as to minimize the oscillation if the TTC eminence is removed or reduced) and decrease as the host vehicle approaches the object O.

Thus, the shape of the curve function and its frequency and amplitude may change as a function of the TTC and the factors recited herein. That is, the shape of the path of the motor vehicle 10 relative to the center of lane L or edge of lane L, as well as the frequency and amplitude toward the left and right of the motor vehicle 10, may vary within a range of defined limits as determined by the predefined map. Similarly, a plurality of superimposed curve functions modulated within a range of frequencies and amplitudes can be applied to effectively lengthen the available stopping distance of the motor vehicle 10.

In operation, the method of the present disclosure of providing emergency in-lane steering assist for maintaining a motor vehicle 10 within a lane L during a braking event begins with the step of detecting the presence of an object O in a present path of the motor vehicle 10 and the distance from the object O to the motor vehicle 10 by use of the forward directed sensor 64. The forward directed sensor 64 then transmits a signal in response to the presence of the object O in front of the motor vehicle 10 and provides data to the vehicle controller 18 from which the distance from the object O to the motor vehicle 10 is determined. A sensor 50 for monitoring the forward vehicle velocity also transmits a signal to the vehicle controller 18, providing data to the vehicle controller 18 from which the forward velocity of the motor vehicle 10 is determined. The vehicle controller 18 then calculates a TTC with the detected object O. If the calculated TTC is less than a predetermined TTC, the vehicle controller 18 selectively actuates the front steering system 22 or rear steering system 28 responsive at least in part to operation by the vehicle controller 18 to provide a lateral steering input expressed as an oscillating curve modulated within a defined range of frequencies and amplitudes during the braking event to reduce the linear distance traveled by the motor vehicle 10 relative to a predetermined path P in the lane L.

The system and method disclosed herein thus provides lateral steering input with or without driver input into the motor vehicle steering system 12. The lateral steering input is preferably expressed as a maximization of lateral steering as, for example, a sine wave modulated within a defined range of frequencies and amplitudes. Thus, the linear distance traveled by the motor vehicle 10 within the lane L relative to a predetermined P path in the lane L may be reduced.

It is to be understood that variations and modifications can be made on the aforementioned system and method without departing from the concepts of the present invention, and further it is to be understood that such concepts are intended to be covered by the following claims unless these claims by their language expressly state otherwise.

What is claimed is:

1. An emergency in-lane steering assist system for maintaining a motor vehicle moving at a velocity within a lane to reduce a linear distance traveled by the motor vehicle during a braking event, the system comprising:
    an object sensor for detecting the presence of an object at a distance from the motor vehicle in a present path of the motor vehicle and from which the distance from the object to the motor vehicle may be determined, the object sensor transmitting a signal in response to the presence of the object in front of the motor vehicle and providing data from which the distance from the object to the motor vehicle is determined;
    a velocity sensor transmitting a signal and providing data from which the velocity of the motor vehicle is determined;
    a controller in communication with the object sensor and the velocity sensor, the controller calculating a Time to Contact (TTC) with the detected object; and
    a steering system responsive at least in part to operation by the controller;
    wherein if the calculated TTC is less than a predetermined TTC, the controller provides a lateral steering input to the steering system as an oscillating side-to-side steering input expressed as an oscillating wave modulated within a defined range of frequencies and amplitudes during the braking event to reduce the linear distance traveled by the motor vehicle relative to a predetermined path in the lane.

2. The emergency in-lane steering assist system of claim 1, wherein the oscillating side-to-side steering input is expressed as a sine wave modulated within a range of frequencies and amplitudes.

3. The emergency in-lane steering assist system of claim 1, wherein the oscillating side-to-side steering input is expressed as a plurality of superimposed curves.

4. The emergency in-lane steering assist system of claim 1, wherein the steering system is electronically actuated.

5. The emergency in-lane steering assist system of claim 1, wherein the steering system is hydraulically actuated.

6. The emergency in-lane steering assist system of claim 1, wherein the object sensor is a forward directed camera for determining the distance and a distance rate of change to the object.

7. The emergency in-lane steering assist system of claim 1, wherein the object sensor is a forward directed radar-based transmitter and receiver for determining the range and range rate of change to the object.

8. The emergency in-lane steering assist system of claim 1, further comprising a manually operated braking system, wherein, if the calculated TTC is less than a predetermined TTC, the controller provides the lateral steering input and the braking system is manually engaged.

9. The emergency in-lane steering assist system of claim 1, further comprising a braking system responsive at least in part to operation by the controller, wherein, if the calculated TTC is less than a predetermined TTC, the controller provides a braking input to the braking system in addition to the lateral steering input.

10. The emergency in-lane steering assist system of claim 1, wherein the oscillating side-to-side steering input expressed as the sine wave modulated within a defined range of frequencies and amplitudes is a function of the group consisting of one or more of a roadway surface coefficient of friction, an ambient temperature, a road curvature, a vehicle instantaneous lane detection capability, a vehicle forward velocity, a vehicle lateral velocity, a vehicle yaw rate, a vehicle roll rate, a vehicle pitch rate, and the calculated TTC.

11. The emergency in-lane steering assist system of claim 10, wherein the oscillating side-to-side steering input expressed as the sine wave modulated within a defined range of frequencies and amplitudes is also a function of the group consisting of considerations of human physiology, including lateral acceleration and deceleration.

12. The emergency in-lane steering assist system of claim 1, wherein the oscillating side-to-side steering input expressed as the sine wave modulated within a defined range of frequencies and amplitudes permits a driver to maintain overall steering control.

13. The emergency in-lane steering assist system of claim 12, wherein the oscillating side-to-side steering input expressed as the sine wave modulated within a defined range of frequencies and amplitudes is obtained by a drive by wire system that isolates the oscillating side-to-side steering input from a driver steering wheel.

14. The emergency in-lane steering assist system of claim 1, wherein the steering system comprises a front wheel steering assembly and the lateral steering input is directed to the front wheel steering assembly.

15. The emergency in-lane steering assist system of claim 1, wherein the steering system comprises a rear wheel steering assembly and the lateral steering input is directed to the rear wheel steering assembly.

16. The emergency in-lane steering assist system of claim 1, wherein the steering system comprises a front wheel steering assembly and a rear wheel steering assembly and the lateral steering input is directed to one or both of the front wheel steering assembly and the rear wheel steering assembly.

17. A method of providing emergency in-lane steering assist for maintaining a motor vehicle within a lane reduce a linear distance traveled by the motor vehicle during a braking event, the method comprising the steps of:

detecting the presence of an object at a distance from the motor vehicle in a present path of the motor vehicle and providing data from which the distance from the object to the motor vehicle may be determined;

transmitting a signal in response to the presence of the object in front of the motor vehicle and providing data to a controller from which the distance from the object to the motor vehicle is determined; transmitting a signal and providing data to the controller from which a velocity of the motor vehicle is determined;

calculating a Time to Contact (TTC) with the detected object; and selectively actuating a steering system responsive at least in part to operation by the controller, wherein if the calculated TTC is less than a predetermined TTC, the controller provides a lateral steering input to the steering system expressed as an oscillating curve modulated within a defined range of frequencies and amplitudes during the braking event to reduce the linear distance traveled by the motor vehicle relative to a predetermined path in the lane.

18. The method of claim 17, further comprising a step of selectively actuating a braking system responsive at least in part to operation by the controller, wherein, if the calculated TTC is less than a predetermined TTC, the controller provides a braking input to the braking system in and the controller provides an oscillating side-to-side steering input to reduce the linear distance traveled by the motor vehicle relative to a predetermined path in the lane.

* * * * *